US012651033B2

(12) United States Patent
Zhang et al.

(10) Patent No.: US 12,651,033 B2
(45) Date of Patent: Jun. 9, 2026

(54) UTILIZING A QUERY RESPONSE TO AUTOMATE A TASK ASSOCIATED WITH A WEBPAGE

(71) Applicant: Tiny Fish Inc., Cupertino, CA (US)

(72) Inventors: Shuhao Zhang, Cupertino, CA (US); Qi Zhai, Hillsborough, CA (US); Daniel Lawrence Schafer, Portola Valley, CA (US); Pavlo Dudka, Mountain View, CA (US); Mingyang Li, Bellevue, WA (US); Urvish Dipakkumar Thakker, Sunnyvale, CA (US)

(73) Assignee: Tiny Fish Inc., Cupertino, CA (US)

( * ) Notice: Subject to any disclaimer, the term of this patent is extended or adjusted under 35 U.S.C. 154(b) by 0 days.

(21) Appl. No.: 18/889,959

(22) Filed: Sep. 19, 2024

(65) Prior Publication Data

US 2025/0068689 A1     Feb. 27, 2025

Related U.S. Application Data

(63) Continuation of application No. 18/415,431, filed on Jan. 17, 2024, now Pat. No. 12,174,906.

(60) Provisional application No. 63/534,541, filed on Aug. 24, 2023.

(51) Int. Cl.
| *G06F 16/00* | (2019.01) |
| *G06F 16/9532* | (2019.01) |
| *G06F 16/9538* | (2019.01) |
| *G06F 16/958* | (2019.01) |

(52) U.S. Cl.
CPC ........ *G06F 16/986* (2019.01); *G06F 16/9532* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 7,096,418 B1 * | 8/2006 | Singhal | G06F 16/9574 715/205 |
| 7,231,606 B2 | 6/2007 | Miller | |
| 8,255,812 B1 | 8/2012 | Parparita | |
| 8,296,123 B2 * | 10/2012 | Thayer | G06F 40/49 704/7 |
| 8,666,961 B1 * | 3/2014 | Qureshi | G06F 16/9535 707/769 |
| 9,286,290 B2 | 3/2016 | Allen | |
| 9,641,591 B1 | 5/2017 | Kolam | |

(Continued)

FOREIGN PATENT DOCUMENTS

| | | |
|---|---|---|
| CN | 103268337 | 8/2013 |
| CN | 106709062 | 5/2017 |

(Continued)

*Primary Examiner* — Jean M Corrielus

(74) *Attorney, Agent, or Firm* — Van Pelt, Yi & James LLP

(57) ABSTRACT

A query and processed webpage content are received. A prompt for a large language model based on the received query and the received processed webpage content is generated. A query response is received from the large language model that is generated in response to providing the prompt to the large language model. Inference patterns are generated based on the query response. The inference patterns are stored in an inference patterns store. The query response is provided.

20 Claims, 6 Drawing Sheets

(56) References Cited

U.S. PATENT DOCUMENTS

| | | | |
|---|---|---|---|
| 9,811,248 B1 | 11/2017 | Berg | |
| 9,824,151 B2 | 11/2017 | Freund | |
| 10,296,571 B2 | 5/2019 | Kosonen | |
| 10,366,140 B2 | 7/2019 | Butt | |
| 10,382,379 B1 * | 8/2019 | Zhang | G06Q 10/107 |
| 10,445,367 B2 * | 10/2019 | Wallenberg | G06F 16/951 |
| 10,521,106 B2 | 12/2019 | Cao | |
| 10,572,894 B1 | 2/2020 | Traupman | |
| 10,585,927 B1 | 3/2020 | Liao | |
| 10,628,630 B1 | 4/2020 | Surace | |
| 11,100,295 B2 | 8/2021 | Hirzel | |
| 11,269,876 B1 * | 3/2022 | Basavaiah | G06F 8/77 |
| 11,748,243 B2 | 9/2023 | Finkelstein | |
| 12,010,076 B1 | 6/2024 | Andrew | |
| 12,014,192 B2 | 6/2024 | Riva | |
| 12,067,362 B2 | 8/2024 | Tunstall-Pedoe | |
| 12,073,180 B2 | 8/2024 | Tunstall-Pedoe | |
| 12,333,260 B2 | 6/2025 | Shi | |
| 2004/0030741 A1 * | 2/2004 | Wolton | G06F 16/954 |
| | | | 709/202 |
| 2006/0020481 A1 | 1/2006 | Lee | |
| 2006/0020515 A1 | 1/2006 | Lee | |
| 2007/0234217 A1 | 10/2007 | Miller | |
| 2009/0012969 A1 | 1/2009 | Rail | |
| 2009/0083363 A1 | 3/2009 | Kiciman | |
| 2009/0083409 A1 | 3/2009 | Kiciman | |
| 2009/0083714 A1 | 3/2009 | Kiciman | |
| 2009/0089312 A1 | 4/2009 | Chi | |
| 2009/0100345 A1 | 4/2009 | Miller | |
| 2009/0319533 A1 * | 12/2009 | Tengli | G06F 16/95 |
| 2009/0327235 A1 | 12/2009 | Coladonato | |
| 2011/0015954 A1 | 1/2011 | Ward | |
| 2012/0192155 A1 | 7/2012 | Silbey | |
| 2012/0290936 A1 | 11/2012 | Mahmud | |
| 2015/0154158 A1 | 6/2015 | Zeine | |
| 2015/0309990 A1 | 10/2015 | Allen | |
| 2016/0042411 A1 | 2/2016 | Avner | |
| 2016/0196111 A1 | 7/2016 | Pujari | |
| 2017/0061528 A1 * | 3/2017 | Arora | G06F 16/958 |
| 2017/0091158 A1 | 3/2017 | Zeine | |
| 2017/0169118 A1 | 6/2017 | Jhaj | |
| 2017/0257393 A1 | 9/2017 | De Barros | |
| 2017/0277625 A1 | 9/2017 | Shtuchkin | |
| 2017/0300403 A1 | 10/2017 | Ramraz | |
| 2018/0060303 A1 | 3/2018 | Sarikaya | |
| 2018/0101537 A1 * | 4/2018 | Govindarajan | G06F 16/24578 |
| 2018/0184178 A1 | 6/2018 | Hoeben | |
| 2019/0050461 A1 | 2/2019 | Schrader | |
| 2019/0179940 A1 * | 6/2019 | Ross | G06F 16/24535 |
| 2019/0260750 A1 | 8/2019 | Mehrdad | |
| 2019/0279084 A1 | 9/2019 | Darachi, Jr. | |
| 2019/0340224 A1 | 11/2019 | Akhoury | |
| 2019/0340256 A1 * | 11/2019 | Kulkarni | G06F 16/24578 |
| 2020/0004798 A1 | 1/2020 | Weinert, Jr. | |
| 2020/0065377 A1 | 2/2020 | Hirzel | |
| 2020/0089597 A1 | 3/2020 | Kastyshyn | |
| 2020/0097303 A1 * | 3/2020 | O'Kane | G06F 16/24575 |
| 2020/0184960 A1 | 6/2020 | Suzuki | |
| 2020/0233707 A1 | 7/2020 | Ramamurthy | |
| 2020/0249963 A1 | 8/2020 | Yeh | |
| 2020/0285353 A1 | 9/2020 | Rezazadeh Sereshkeh | |
| 2020/0334301 A1 | 10/2020 | Walters | |
| 2020/0349215 A1 | 11/2020 | Mcmurray | |
| 2021/0019309 A1 * | 1/2021 | Yadav | G06F 16/2428 |
| 2021/0191986 A1 | 6/2021 | Okajima | |
| 2021/0255914 A1 * | 8/2021 | Ciabarra, Jr. | G06F 11/079 |
| 2021/0256076 A1 | 8/2021 | Mcmurray | |
| 2021/0295382 A1 * | 9/2021 | Buchanan | G06Q 30/0631 |
| 2021/0304064 A1 | 9/2021 | Mudi | |
| 2021/0311939 A1 | 10/2021 | Shtilkind | |
| 2021/0392144 A1 | 12/2021 | Vaidyanath | |
| 2022/0269736 A1 | 8/2022 | Walters | |
| 2022/0284064 A1 | 9/2022 | Shaw | |
| 2023/0095006 A1 * | 3/2023 | Riva | G06F 40/20 |
| | | | 715/762 |
| 2023/0161972 A1 | 5/2023 | Härmä | |
| 2023/0195825 A1 | 6/2023 | Rao | |
| 2023/0274094 A1 | 8/2023 | Tunstall-Pedoe | |
| 2023/0393810 A1 | 12/2023 | Lange | |
| 2024/0242154 A1 | 7/2024 | Jindal | |
| 2024/0281446 A1 | 8/2024 | Bathwal | |
| 2024/0289360 A1 | 8/2024 | Chepkwony | |
| 2024/0303441 A1 | 9/2024 | Sobhy Deraz | |

FOREIGN PATENT DOCUMENTS

| | | |
|---|---|---|
| CN | 108009183 | 5/2018 |
| CN | 108769832 | 11/2018 |
| CN | 111367414 | 10/2020 |
| CN | 112540736 | 3/2021 |
| CN | 114127672 | 3/2022 |
| CN | 114647806 | 6/2022 |
| CN | 114780893 | 7/2022 |
| CN | 115017397 | 9/2022 |
| CN | 117555539 | 2/2024 |
| EP | 3767567 | 1/2021 |

* cited by examiner

```
{
    header {
        login_btn
        search_box
        search_btn
    }
}
```

FIG. 1A

```
header {
    login_btn
}
```

FIG. 1B

```
{
    "tf_11": {
        "role": "navigation",
        "html_tag": "header"
        "children": {
            "tf_22": {
                "role": "button",
                "name": "login",
                "html_tag": "button"
            },
            "APjFqb": {
                "role": "combobox",
                "name": "Search",
                "html_tag": "textarea"
            },
            "tf_194": {
                "role": "button",
                "name": "Search",
                "html_tag": "button"
            }
        }
    },
    //All other HTML elements
}
```

FIG. 2

```
{
    header {
        "login_btn": {
            "role": "button",
            "name": "login",
            "id": "tf_22",
            "html_tag": "button"
        },
        "search_box": {
            "role": "combobox",
            "name": "Search",
            "id": "APjFqb",
            "html_tag": "textarea"
        },
        "search_btn": {
            "role": "button",
            "name": "Search",
            "id": "tf_194",
            "html_tag": "button"
        }
    }
}
```

FIG. 3

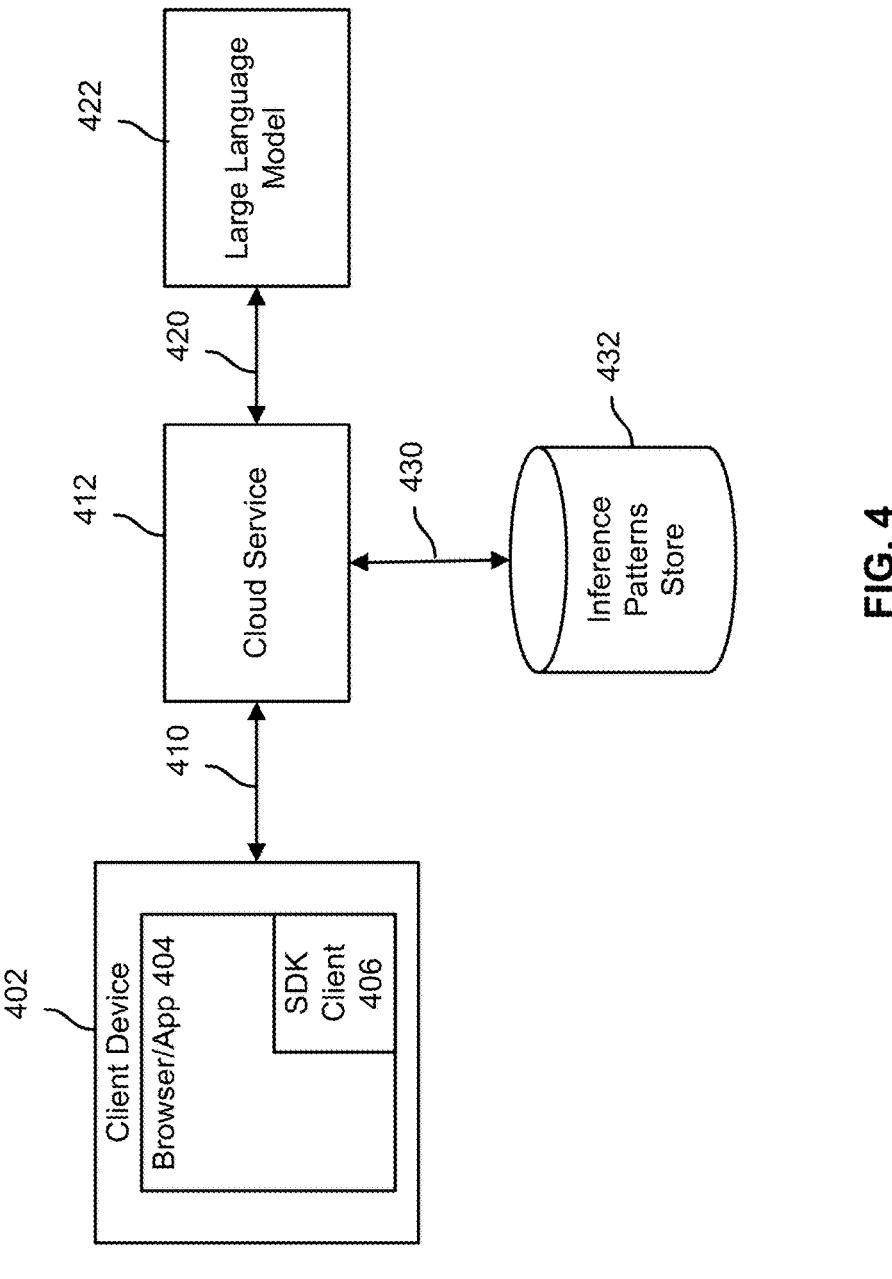
FIG. 4

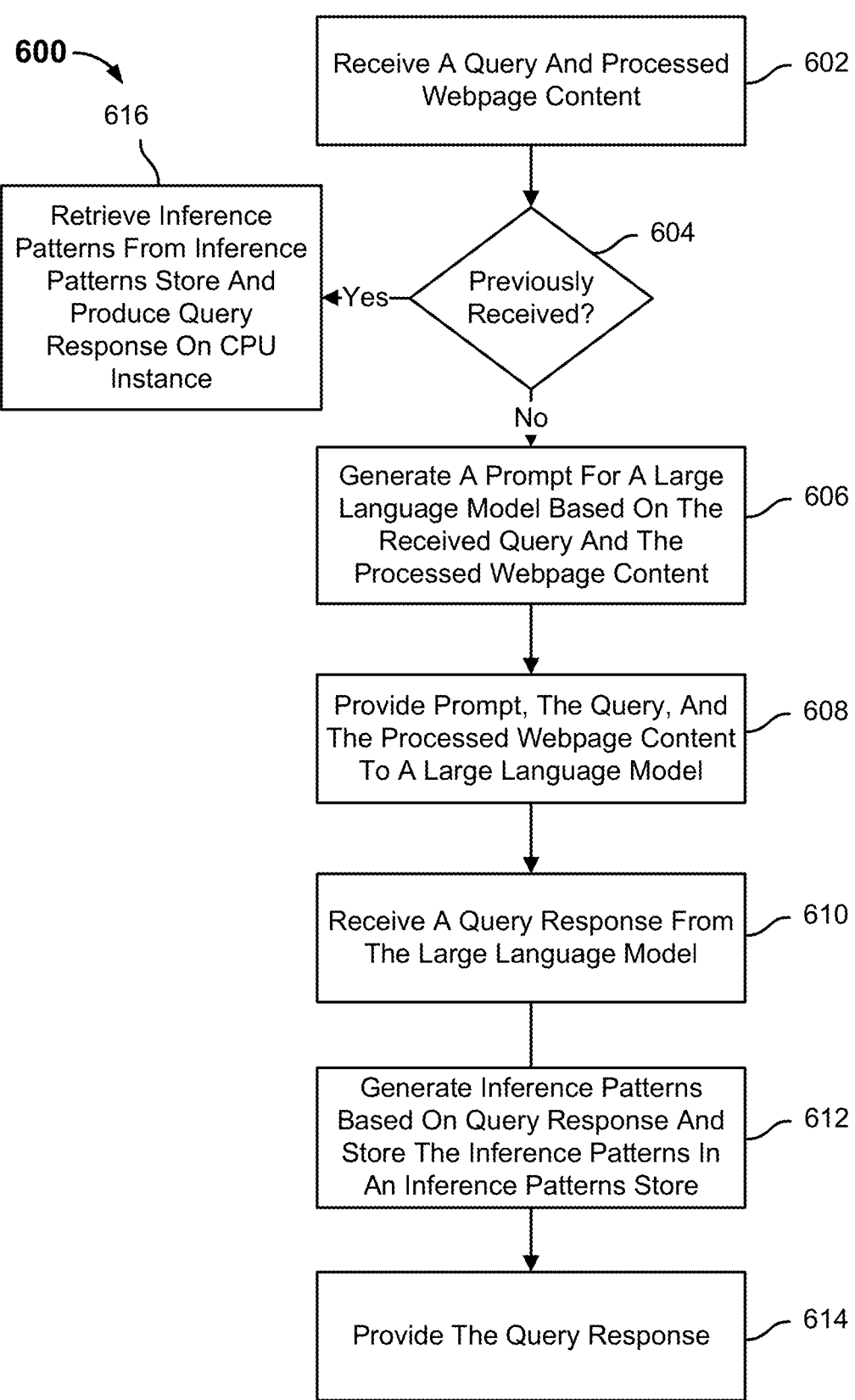

600

616

Retrieve Inference Patterns From Inference Patterns Store And Produce Query Response On CPU Instance Receive A Query And Processed Webpage Content — 602

◄—Yes— Previously Received? — 604

No

Generate A Prompt For A Large Language Model Based On The Received Query And The Processed Webpage Content — 606

Provide Prompt, The Query, And The Processed Webpage Content To A Large Language Model — 608

Receive A Query Response From The Large Language Model — 610

Generate Inference Patterns Based On Query Response And Store The Inference Patterns In An Inference Patterns Store — 612

Provide The Query Response — 614

FIG. 6

UTILIZING A QUERY RESPONSE TO AUTOMATE A TASK ASSOCIATED WITH A WEBPAGE

CROSS REFERENCE TO OTHER APPLICATIONS

This application is a continuation of U.S. patent application Ser. No. 18/415,431 entitled UTILIZING A QUERY RESPONSE TO AUTOMATE A TASK ASSOCIATED WITH A WEBPAGE filed Jan. 17, 2024, which claims priority to U.S. Provisional Patent Application No. 63/534,541 entitled WEB AGENT DESCRIPTION LANGUAGE filed Aug. 24, 2023, each of which is incorporated herein by reference for all purposes.

BACKGROUND OF THE INVENTION

A developer may generate a script to automate a task associated with a webpage. The script is comprised of one or more rule(s) that describe how a browser interacts with the webpage. The webpage is comprised of a plurality of webpage elements. The script may be programmed to interact with a particular webpage element in a particular manner based on an identifier associated with the particular webpage element. However, the identifier associated with the particular webpage element may be dynamic. Web pages may be periodically updated. The particular webpage element may have a first identifier before the webpage update and a second identifier after the web page update. As a result, the script may stop working properly. This requires the developer to spend time and resources to fix the script or generate a new script.

BRIEF DESCRIPTION OF THE DRAWINGS

Various embodiments of the invention are disclosed in the following detailed description and the accompanying drawings.

FIG. 1A is an example of a query for a website in accordance with some embodiments.

FIG. 1B is an example of a query for a website in accordance with some embodiments.

FIG. 2 is an example of processed webpage content in accordance with some embodiments.

FIG. 3 is an example of a query response in accordance with some embodiments.

FIG. 4 is a block diagram illustrating a system to generate an adaptable script to automate a task associated with a webpage in accordance with some embodiments.

FIG. 6 is a flow diagram illustrating a process to generate a query response in accordance with some embodiments.

DETAILED DESCRIPTION

Figure 5:
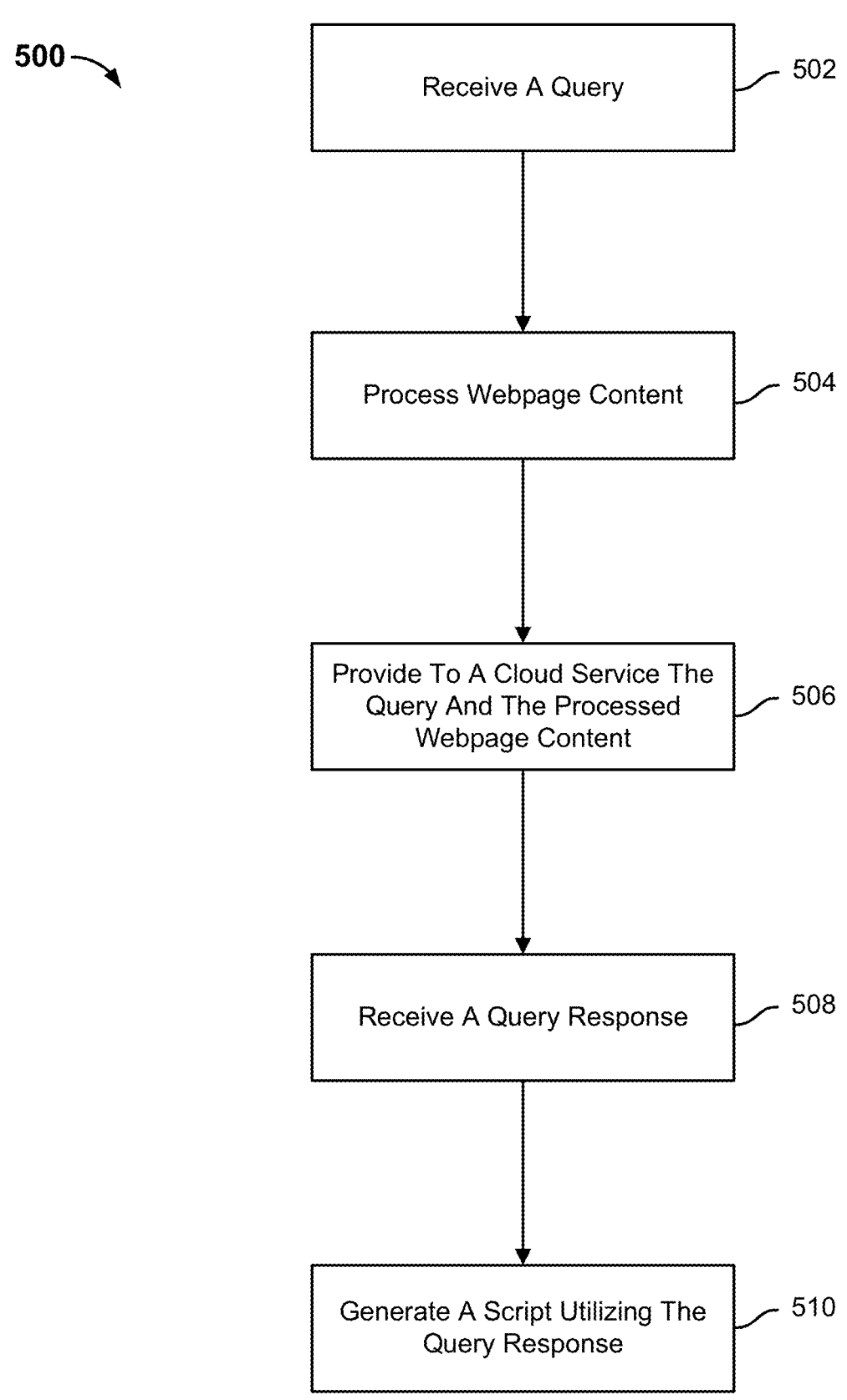
FIG. 5 is a flow diagram illustrating a process to generate an adaptable script to automate a task associated with a webpage in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to generate an adaptable script to automate a task associated with a webpage is disclosed. The technique includes receiving a query from a client device. The query is a structured request, formulated in natural language, for specific web elements from a webpage. The query serves as a representation to extract precise information from the webpage. The query is structured in a manner that signifies a relationship between a component and the webpage. The query is comprised of one or more variables that correspond to one or more specific web elements associated with a webpage. The query is designed to be versatile across different types of websites (e.g., e-commerce, business, nonprofit, entertainment, event, brochure, membership, forum, social media, etc.). FIGS. 1A and 1B illustrate example queries that can be conveniently applied to different websites, ensuring consistency and efficiency.

FIG. 1A is an example of a query for a website in accordance with some embodiments. The example query may be utilized for a script that automates a booking process for a flight, a hotel, a car, a vacation, a reservation, etc. In the example shown, the query has specified a first variable "login_btn," a second variable "search_box," and a third variable "search_btn." The first variable "login_btn" corresponds to a login button associated with the webpage, the second variable "search_box" corresponds to a search box associated with the webpage, and the third variable "search_btn" corresponds to a search button associated with the webpage.

FIG. 1B is an example of a query for a website in accordance with some embodiments. The example query may be utilized for a script associated with a webpage having a login button within the navigation header. In the example shown, the query has specified a first variable "login_btn." The first variable "login_btn" corresponds to a login button associated with the webpage. In both examples of FIG. 1A and FIG. 1B, the variables are given names that correspond to webpage elements that the developer would like to utilize for a script associated with the webpage but are unknown to the developer.

The technique further includes processing webpage content as a human-friendly representation of the HMTL associated with the webpage, with notations for each element. Processing the webpage content includes determining information associated with the webpage elements. The information associated with the webpage elements include a corresponding "role," a corresponding "name," and a corresponding "html_tag."

FIG. 2 is a simplified example of processed webpage content in accordance with some embodiments. In the example shown, for a particular web element, the processed webpage content indicates a "role," a "name," and an "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element. Although the processed webpage content in the example includes information associated with three webpage elements, the processed webpage content may include information associated with n webpage elements.

The technique further includes requesting a cloud service to generate a query response by providing to the cloud service the processed webpage content and the received query. In response, the cloud service utilizes the pre-processed webpage content and the received query to generate a prompt for a large language model (LLM) trained to understand the semantics of web content. The notations for each element included in the processed webpage content help the LLM to determine the purpose of the webpage elements. The prompt, the received query, and the processed webpage content are provided to the LLM. In response, the LLM generates a query response and provides the query response to the cloud service.

FIG. 3 is an example of a query response in accordance with some embodiments. The query response is a structured representation of specified web element nodes. The query response maps a variable included in the query to a corresponding webpage element included in the processed webpage content. Users may utilize this mapping to interact with the web element nodes by performing actions, such as click, input, etc. The interaction capability is similar to what a user could perform on the actual web page. In the example shown, for a particular web element, the query response indicates a "role," a "name," an "id," and an "html_tag." The "id" parameter determines a specified identifier for a particular web element. The LLM, indicated by the query response, has determined which web element corresponds to the variable "login_btn," which web element corresponds to the variable "search_box," and which web element corresponds to the variable "search_btn." Instead of using the specified identifier for a particular web element, a developer may utilize a variable included in the query that corresponds to the particular web element to generate the script to automate a task associated with the webpage.

The cloud service may store the query response in an inference patterns store. The inference patterns preserves the mapping of response nodes to their corresponding HTML elements via patterns, such as XPath, DOM attributes and other distinctive patterns that can be used to locate an HTML element within a webpage. Storing the inference pattern in the inference pattern store enables the cloud service to generate the response for the same query in a webpage that has similar structure without prompting the LLM. This reduces latency and graphical processing unit (GPU) costs associated with utilizing the LLM to generate the query response. An example of a "similar webpage" is that, an e-commerce search result page, though search keywords are different, the search result pages are considered as "similar web pages" as they share the same page structure, and the stored inference patterns can be used to produce responses to queries on CPU instances.

The cloud service provides the query response to the client device. A browser or application associated with the client device includes application programming interface(s) (APIs) that enables object-oriented programming interfaces to be generated based on the query response. The APIs provide various functionality to interact with the web elements. The APIs are supported by one or more programming languages, such as Python, JavaScript, etc. Users associated with a client device may utilize the APIs to create web automation solutions for a wide range of everyday applications.

In the event a script becomes nonfunctional because the identifier associated with a webpage element has been modified, the webpage content may be processed again to determine the updated information associated with the webpage elements. The prompt, the query, and the updated processed webpage content may be provided to determine an updated query response, which maps a variable associated with an old webpage element identifier to a new webpage element identifier. Instead of having a developer debug the script line-by-line to determine which web element identifier has changed, implementing the LLM significantly reduces the time and resources needed to debug a nonfunctional script or to generate a new script. The LLM can effortlessly map the one or more variables included in the query to the one or more web elements included in the processed webpage content since the LLM is trained to understand the semantics of web content.

FIG. 4 is a block diagram illustrating a system to generate an adaptable script to automate a task associated with a webpage in accordance with some embodiments. In the example shown, system 400 includes a client device 402, a cloud service 412, a LLM 422, and an inference patterns store 432. Client device 402 may be a computer, a laptop, a desktop, a server, a tablet, a smart device, or any other computing device. Client device 402 includes browser/app 404. Browser/app 404 is configured to retrieve one or more webpages from the Internet.

Browser/app 404 is configured to receive a query associated with a webpage. The query is a structured request, formulated in natural language, for specific web elements from a webpage. The query is comprised of one or more variables that correspond to one or more specific web elements associated with the webpage.

Code associated with SDK client 406 is included in browser/app 404. SDK client 406 is configured to capture content associated with a webpage, process the content associated with the webpage into a specific format, and provide the processed content to cloud service 412. SDK client 406 includes functionality to interact with the annotated version of the web elements (e.g., the query response). SDK client 406 provides API(s) that enable actions, such as client, input, etc., to be performed. SDK client 406 is configured to provide error handling. An instruction step associated with a web automation solution may have an error handler. SDK client 406 is configured to cache a corresponding response for an instruction step for investigation and logging. In the event of an instruction execution failure not caused by web page changes, SDK client 406 is configured to continue and retry a script from a failed step without having to rerun prior steps. This ensures the scripting environment won't execute the same command or perform the same action repeatedly, especially for transaction-related tasks.

SDK client 406 is configured to determine, for a particular web element, a corresponding "role," a corresponding "name," and a corresponding "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element.

SDK client 406 is configured to request cloud service 412 to generate a query response by providing to cloud service 412, via connection 410, the processed webpage content and the received query. Connection 410 may be a wired or wireless connection. Connection 410 may be the Internet, an intranet, a wireless area network, a personal area network, a wireless local area network, a virtual private network, etc.

In response, cloud service 412 utilizes the processed webpage content and the received query to generate a prompt for LLM 422. In some embodiments, LLM 422 is part of cloud service 412. In some embodiments, LLM 422 is a separate entity from cloud service 412.

The notations for each element included in the processed webpage content help LLM 422 to determine the purpose of the elements. LLM 422 is trained to understand the semantics of web content. The prompt, the query, and the processed webpage content are provided to LLM 422 via connection 420. Connection 420 may be a wired or wireless connection. Connection 420 may be the Internet, an intranet, a wireless area network, a personal area network, a wireless local area network, a virtual private network, etc.

In response, LLM 422 is configured to generate a query response and provide the query response to cloud service 412. The query response is an annotated representation of web elements as specified in the query. The query response maps a variable included in the query to a corresponding webpage element included in the processed webpage content. This response is designed to be user-friendly and easy to understand, in contrast to traditional HTML. It enhances the accessibility of web pages, allowing users to interact with the specified web elements as described in the query response. In addition to providing, for a particular web element, a corresponding "role," a corresponding "name," and a corresponding "html_tag," the query response also includes a corresponding "identifier" for the particular web element. The identifier denotes a specified identifier for a given web element. Instead of using the specified identifier for a particular web element, a developer may utilize a variable included in the query that corresponds to the particular web element to generate the script to automate a task associated with the webpage.

Cloud service 412 is configured to store the inference patterns derived from the query response in inference patterns store 432 via connection 430. Connection 430 may be a wired or wireless connection. Connection 430 may be the Internet, an intranet, a wireless area network, a personal area network, a wireless local area network, a virtual private network, etc. In some embodiments, inference patterns store 432 is included in a storage device that is local to or remote from cloud service 412. The query response preserves the mapping of response nodes to their corresponding HTML elements via XPaths, DOM attributes and other distinctive patterns for identifying HTML elements within a webpage. Storing the inference patterns in the inference patterns store enables the cloud service to generate the query response for the same query and similar webpage without prompting LLM 422 to generate the same query response on CPU instances. This reduces latency and GPU costs associated with utilizing LLM 422 to generate the query response.

Cloud service 412 is configured to provide the query response to client SDK 406. Client SDK 406 includes application programming interface(s) (APIs) that enables object-oriented programming interfaces to be generated based on the query response. The APIs provide various functionality to interact with the web elements. The APIs are supported by one or more programming languages, such as Python, JavaScript, etc. Users associated with a client device may utilize the APIs to create web automation solutions for a wide range of everyday applications.

FIG. 5 is a flow diagram illustrating a process to generate an adaptable script to automate a task associated with a webpage in accordance with some embodiments. In the example shown, process 500 may be implemented by a client SDK, such as client SDK 406.

At 502, a query is received. The query is a structured request, formulated in natural language, for specific web elements from a webpage. The query serves as a representation to extract precise information from the webpage. The query is structured in a manner that signifies a relationship between a component and the webpage. The query is comprised of one or more variables that correspond to one or more specific web elements associated with a webpage. The query is designed to be versatile across different types of websites.

At 504, webpage content is processed. The processed webpage is a human-friendly representation of the HMTL associated with the webpage, with notations for each element. For a particular web element, the processed webpage content indicates a "role," a "name," and an "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element.

At 506, the query and the processed webpage content are provided to a cloud service.

At 508, a query response is received from the cloud service. The query response is a structured representation of specified web element nodes. The query response maps a variable included in the query to a corresponding webpage element included in the processed webpage content.

At 510, an automated task is generated utilizing the query response. Code associated with the automated task is generated utilizing the variables included in the query. For example, an automated task may include booking a flight on a travel website, purchasing a product on an e-commerce website, scheduling an appointment at a medical facility, etc. The variables "login_btn," "search_box," and "search_btn" from FIG. 1A may be utilized instead of "tf_22," "APjFqB," and "tf_194," respectively.

In the event an identifier associated with a web element changes due to an update in the web page, an automated task may not function properly because a variable included in the script is not correctly mapped to the correct web element. Steps 504-508 may be repeated to enable the LLM to determine a new mapping between the updated web element identifier and the variable included in the query. For example, the query response may map the variable "login_btn" to a web element having an identifier of "identifier_1." The web page may be updated such that the web element having the identifier of "identifier_1" now has an identifier of "identifier_2." Process 500 may be repeated to enable the LLM to update the mapping such that the variable "login_btn" is mapped to the web element having the identifier of "identifier 2."

In some embodiments, steps 504-508 are periodically performed (e.g., daily, weekly, monthly, etc.). In some embodiments, steps 504-508 are performed in response to a user command. In some embodiments, steps 504-508 are performed as a background process.

Instead of having a developer debug the script line-by-line to determine which web element identifier has changed, implementing the LLM significantly reduces the time and resources needed to debug a nonfunctional script or to generate a new script. The LLM can effortlessly map the one or more variables included in the query to the one or more web elements included in the processed webpage content since the LLM is trained to understand the semantics of web content.

FIG. 6 is a flow diagram illustrating a process to generate a query response in accordance with some embodiments. In the example shown, process 600 may be implemented by a cloud service, such as cloud service 412.

At 602, a query and processed webpage content are received from a client device. The query is a structured request, formulated in natural language, for specific web elements from a webpage. The query is comprised of one or more variables that correspond to one or more specific web elements associated with a webpage. The variables are given names that correspond to webpage elements that the developer would like to utilize for a script associated with the webpage but are unknown to the developer. The processed webpage content is a human-friendly representation of the HMTL associated with the webpage, with notations for each element.

At 604, it is determined whether the query and the processed similar webpage content have been previously received. In response to a determination that the query and the processed similar webpage content have been previously received, process 600 proceeds to 616 where a query response is produced on CPU instances by using the inference patterns from the inference patterns store. In response to a determination that the query and the processed webpage content have not been previously received, process 600 proceeds to 606.

At 606, a prompt for a LLM is generated based on the received query and the processed webpage content. An example of a generated prompt is:

> You are an expert in understanding the structure of the web page. You will be given a simplified Web Page accessibility tree (created following Aria spec) and a GraphQL-like query that is supposed to query various web page elements. Provide a hypothetical response to such a query in a GraphQL-like response format. Return only response in the following format:

```
{
  {response}
}
```

At 608, the prompt, the query, and the processed webpage content are provided to the LLM.

At 610, a query response is received from the LLM. The query response is a structured representation of specified web element nodes. The query response maps a variable included in the query to a corresponding webpage element included in the processed webpage content. For each web element, the query response indicates a "role," a "name," an "id," and an "html_tag."

At 612, the query response is used to generate inference patterns which are saved in an inference patterns store. Storing the inference patterns in the inference patterns store enables the cloud service to generate the query response for the same query and similar webpages on CPU instances without prompting the LLM to generate the query response. This reduces latency and GPU costs associated with utilizing the LLM to generate the query response.

At 614, the query response is provided to the client device.

Figure 7:
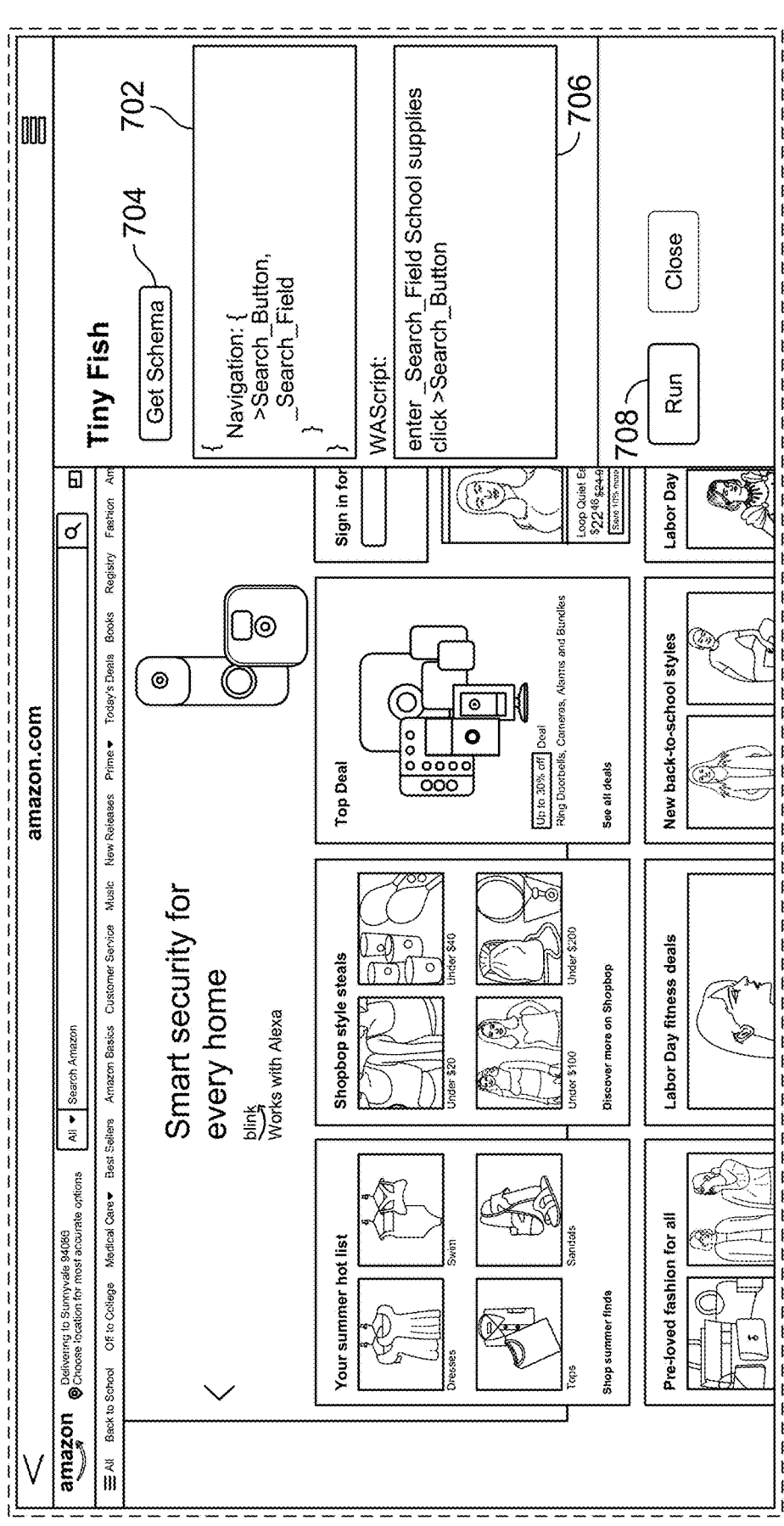
FIG. 7 is an example of a user interface to automate a task in accordance with some embodiments.

FIG. 7 is an example of a user interface to automate a task in accordance with some embodiments. In the example shown, user interface 700 may be implemented as a browser extension. User interface 700 includes a first area 702 that enables a user to define a query associated with a webpage. User interface 700 includes a first button 704 that causes processes 500 and 600 to be implemented. The browser extension fetches the query response to the query and returns an annotated representation of the requested web elements. User interface 700 includes a second area 706 that enables the user to define an automated task to be generated for the webpage using the one or more variables included in the query. A user may execute a script, such as Javascript, to interact with the web elements defined in the query. User 708 includes button 708 that enables the automated task to be implemented with respect to the webpage.

In the example shown, user interface 700 which may be implemented as a browser extension. It has the ability to specify a query for a particular web page and validate the syntax of the query. Also, it has the ability to format a query to the standard format and represent it in a visually appealing format which makes the query more human readable. The user extension also aids in visualizing the query. It also has the ability to fetch response for a given query and visualize the response of the query with the user interface. So, the user interface has the capability to specify the query and fetch the query response. When the user interface is implemented as a browser extension it also enables one to visualize the response of the query in the browser and see the actual DOM nodes corresponding to the response of the query.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by a web browser application associated with a client device, a first instance of a query and processed webpage content, wherein the processed webpage content is processed by determining corresponding information associated with a plurality of user interface web elements associated with a webpage, wherein the corresponding information associated with the plurality of user interface web elements associated with the webpage includes one or more of a corresponding role, a corresponding name, and/or a corresponding tag for a plurality of web elements associated with the webpage;
   generating a prompt for a large language model based on the received query and the received processed webpage content;

receiving a query response from the large language model that is generated in response to providing the prompt to the large language model, wherein the query response preserves a mapping of response nodes to corresponding user interface web elements;

generating inference patterns based on the query response;

storing the inference patterns in an inference patterns store;

providing the query response to a client software development kit (SDK) included in the browser application, wherein the client SDK includes one or more application programming interface(s) (APIs) that enable object-oriented programming interfaces to be generated based on the query response and provide functionality to interact with the web elements, wherein the APIs are supported by one or more programming languages;

receiving, by the web browser application associated with the client device, a second instance of the query and the processed webpage content;

determining, based on the mapping of response nodes to corresponding user interface web elements, that the query and the processed webpage content have been previously received;

in response to a determination that query and the processed webpage content have been previously received:

retrieving the inference patterns that are based on the query response received from the large language model from the inference pattern store; and generating a second query response utilizing the inference patterns from the inference pattern store; and generating, using the one or more APIs included in the client SDK, an automated task for the webpage utilizing the second query response.

2. The method of claim 1, wherein the query includes one or more variables to be used for a script associated with the webpage.

3. The method of claim 2, wherein the one or more variables correspond to one or more specific web elements associated with the webpage.

4. The method of claim 1, wherein the corresponding role describes a role of a particular web element of the plurality of web elements in an accessibility tree.

5. The method of claim 1, wherein the corresponding name represents the name of a particular web element of the plurality of web elements as specified in an original webpage accessibility tree.

6. The method of claim 1, wherein the corresponding tag denotes an original html tag of a particular web element of the plurality of web elements.

7. The method of claim 1, further comprising providing the prompt, the received query, and the received processed webpage content to the large language model.

8. A system, comprising:

a processor configured to:

receive, by a web browser application associated with a client device, a first instance of a query and processed webpage content, wherein the processed webpage content is processed by determining corresponding information associated with a plurality of user interface web elements associated with a webpage, wherein the corresponding information associated with the plurality of user interface web elements associated with the webpage includes one or more of a corresponding role, a corresponding name, and/or a corresponding tag for a plurality of web elements associated with the webpage;

generate a prompt for a large language model based on the received query and the received processed webpage content;

receive a query response from the large language model that is generated in response to providing the prompt to the large language model, wherein the query response preserves a mapping of response nodes to corresponding user interface web elements;

generate inference patterns based on the query response;

store the inference patterns in an inference patterns store;

provide the query response to a client software development kit (SDK) included in the browser application, wherein the client SDK includes one or more application programming interface(s) (APIs) that enable object-oriented programming interfaces to be generated based on the query response and provide functionality to interact with the web elements, wherein the APIs are supported by one or more programming languages;

receive, by the web browser application associated with the client device, a second instance of the query and the processed webpage content;

determine, based on the mapping of response nodes to corresponding user interface web elements, that the query and the processed webpage content have been previously received;

in response to a determination that query and the processed webpage content have been previously received:

retrieve the inference patterns that are based on the query response received from the large language model from the inference pattern store; and generate a second query response utilizing the inference patterns from the inference pattern store; and generating, using the one or more APIs included in the client SDK, an automated task for the webpage utilizing the second query response; and a memory coupled to the processor and configured to provide the processor with instructions.

9. The system of claim 8, wherein the query includes one or more variables to be used for a script associated with the webpage, wherein the one or more variables correspond to one or more specific web elements associated with the webpage.

10. The system of claim 8, wherein the corresponding role describes a role of a particular web element of the plurality of web elements in an accessibility tree.

11. The system of claim 8, wherein the corresponding name represents the name of a particular web element of the plurality of web elements as specified in an original webpage accessibility tree.

12. The system of claim 8, wherein the corresponding tag denotes an original html tag of a particular web element of the plurality of web elements.

13. The system of claim 8, wherein the processor is configured to provide the prompt, the received query, and the received processed webpage content to the large language model.

14. A computer program product embodied in a non-transitory computer readable medium and comprising computer instructions for:

receiving, by a web browser application associated with a client device, a first instance of a query and processed webpage content, wherein the processed webpage content is processed by determining corresponding information associated with a plurality of user interface web elements associated with a webpage, wherein the corresponding information associated with the plurality of user interface web elements associated with the webpage includes one or more of a corresponding role, a corresponding name, and/or a corresponding tag for a plurality of web elements associated with the webpage;

generating a prompt for a large language model based on the received query and the received processed webpage content;

receiving a query response from the large language model that is generated in response to providing the prompt to the large language model, wherein the query response preserves a mapping of response nodes to corresponding user interface web elements;

generating inference patterns based on the query response;

storing the inference patterns in an inference patterns store;

providing the query response to a client software development kit (SDK) included in the browser application, wherein the client SDK includes one or more application programming interface(s) (APIs) that enable object-oriented programming interfaces to be generated based on the query response and provide functionality to interact with the web elements, wherein the APIs are supported by one or more programming languages;

receiving, by the web browser application associated with the client device, a second instance of the query and the processed webpage content;

determining, based on the mapping of response nodes to corresponding user interface web elements, that the query and the processed webpage content have been previously received;

in response to a determination that query and the processed webpage content have been previously received:

retrieving the inference patterns that are based on the query response received from the large language model from the inference pattern store; and generating a second query response utilizing the inference patterns from the inference pattern store; and generating, using the one or more APIs included in the client SDK, an automated task for the webpage utilizing the second query response.

15. The computer program product of claim 14, wherein the query includes one or more variables to be used for a script associated with the webpage.

16. The computer program product of claim 15, wherein the one or more variables correspond to one or more specific web elements associated with the webpage.

17. The computer program product of claim 14, wherein the corresponding role describes a role of a particular web element of the plurality of web elements in an accessibility tree.

18. The computer program product of claim 14, wherein the corresponding name represents the name of a particular web element of the plurality of web elements as specified in an original webpage accessibility tree.

19. The computer program product of claim 14, wherein the corresponding tag denotes an original html tag of a particular web element of the plurality of web elements.

20. The computer program product of claim 14, further comprising instructions for providing the prompt, the received query, and the received processed webpage content to the large language model.

* * * * *